United States Patent [19]

Ekeleme, Jr. et al.

[11] Patent Number: 4,543,987
[45] Date of Patent: Oct. 1, 1985

[54] RELIEF VALVE

[75] Inventors: Charles E. Ekeleme, Jr., Durham; Rabian M. Martin, Hurdle Mills, both of N.C.

[73] Assignee: Eaton Corporation, Cleveland, Ohio

[21] Appl. No.: 604,675

[22] Filed: Apr. 27, 1984

[51] Int. Cl.⁴ .............................................. F16K 17/04
[52] U.S. Cl. .................... 137/540; 137/522; 137/843; 251/86; 251/334
[58] Field of Search ........... 137/469, 540, 542, 543.13, 137/543.19, 843; 251/82, 83, 86, 334

[56] References Cited

U.S. PATENT DOCUMENTS

| | | | |
|---|---|---|---|
| 1,476,383 | 12/1923 | Twardowsky | 137/540 X |
| 1,763,927 | 6/1930 | Ireland | 251/86 |
| 1,934,314 | 11/1933 | Lawler | 251/86 |
| 2,740,425 | 4/1956 | Garland | 251/86 X |
| 3,733,048 | 5/1973 | Hiszpansky | 137/843 X |
| 4,327,767 | 5/1982 | Fehrenbach | 251/86 X |

Primary Examiner—Robert G. Nilson
Attorney, Agent, or Firm—C. H. Grace; C. J. Toddy

[57] ABSTRACT

A relief valve (10) incorporating a poppet assembly (14) having a metallic sealing disc (46) in engagement with an annular valve seat (34). The disc is acted on by a ball (44) received within a recess formed in the end of the poppet stem (36). The disc and the ball are retained in free-floating relationship with the stem by means of a cylindrical retainer (40), which allows the ball to center itself over the disc and valve seat and thus effectively apply the closing force at a point at the center of the disc. The point application of the closing force causes the disc to flex a finite amount, which causes the disc to contact the inner edge only of the annular valve seat, thus approximating an ideal knife-edge engagement between the valve seal and the seat.

5 Claims, 2 Drawing Figures

RELIEF VALVE

The present invention relates to pressure relief valves, and more particularly to a relatively inexpensive metal seat relief valve having positive sealing characteristics.

In relief valve applications wherein the valve is subjected to high-temperatures, or where the relieved fluid is other than air, for example steam or a chemical vapor, it is not possible to use a conventional elastomeric valve element. In these applications it is generally necessary to use a valve having a metal seal element in engagement with a metal seat. In order to obtain positive bubble-tight sealing characteristics, prior art valves of this type have required the use of highly sophisticated manufacturing techniques, resulting in extremely high costs.

Typically, in accordance with prior art practices, a valve which provides bubble-tight sealing in the neighborhood of 95% of pop pressure requires manufacturing tolerences closer than ±0.0005 in. on mating parts, mating angles machined at tolerances within several minutes, surface finishes better than 1.0 rms, complex maching operations, and the maintenance of concentricities of around 0.0005 TIR.

The present invention provides a positive sealing valve which does not require the above extremely close tolerances in its manufacture. More specifically, the present invention provides a relief valve having a metal seal element operating through a multi-jointed poppet arrangement.

It has long been known that the ideal valve seat is a knife edge. However, it is apparent that a valve having a true knife-edge seat is not practical since the area of the seat in contact with the seal disc is extremely small resulting in an extremely high pressure acting on the seat, even when the force on the seal disc is relatively small. Also, a true knife edge seat is subject to distortion and erosion due to the impact of high-velocity particulate matter, resulting in short life and leakage.

The present invention provides a relief valve having a valve seat configuration which approximates a knife edge to achieve performance characteristics which approach those which are theoretically achievable with a knife edge, while minimizing the adverse aspects of such a configuration.

More specifically, the present invention provides a metal seal disc which is designed to flex under load such that the convex surface of the flexed seal disc acts against the inner edge of a flat-topped valve seat. The seal disc is free floating within a cage structure and is acted on by a ball, thereby assuring proper alignment of the seal disc with the valve stem and proper distribution of the valve spring force, while not requiring particularly close machining tolerances.

Other objectives and advantages of the invention will be apparent from the following description when considered in connection with the accompanying drawings, wherein.

Figure 1:
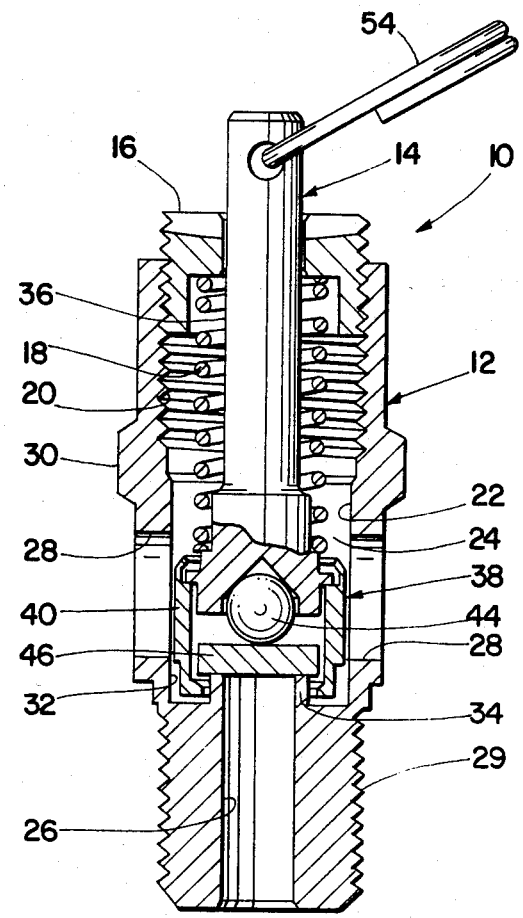
FIG. 1 is in cross-sectional view of the invention.

Referring to FIG. 1, there is illustrated a relief valve, designated generally by the numeral 10, comprising a generally cylindrical valve body 12, a poppet assembly 14 received within the valve body, a spring retainer 16 received over the poppet assembly and threadedly received in the valve body, and a compression spring 18 acting between the spring retainer and the poppet assembly.

A stepped bore is formed axially through the valve body, including a first relatively large diameter portion 20 into which the spring retainer 16 is threaded, an intermediate diameter portion 22 which defines a main valve chamber 24, and a relatively small diameter inlet bore portion 26. A plurality of radial exhaust ports 28 are formed through the valve body to define exhaust ports opening outward from the valve chamber 24.

The valve body 12 is threaded at its inlet end 29 for attachment to a tank or pipe fitting or the like, and a hexagonal section 30 is formed thereon to facilitate attachment. The end of the bore 22 adjacent the inlet bore 26 is machined to define an annular chamber 32 surrounding a raised valve seat 34.

The poppet assembly 14 comprises an elongated cylindrical stem member 36, one end of which extends through a central bore formed in the spring retainer 16, and a valve assembly 38 attached to the opposite end thereof. The valve assembly comprises a cylindrical retainer 40 having one end received over a shoulder 42 formed on the stem member 36, a ball 44 received in a depression formed in the end of the stem member, and a metallic valve disc 46 which is received within the retainer 40 in free-floating relationship therewith and with the ball 44.

Figure 2:
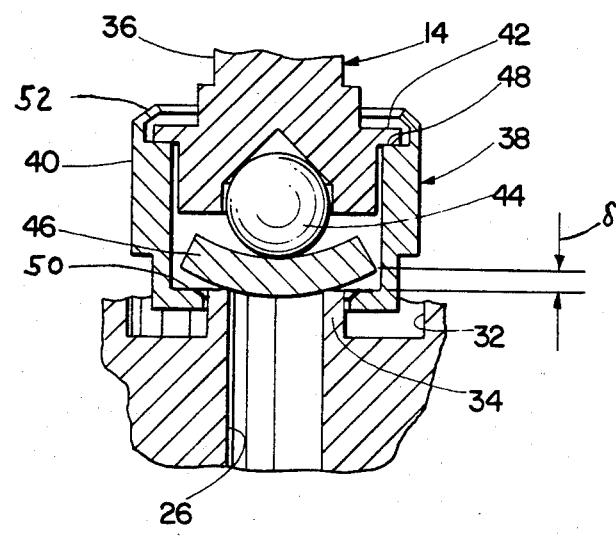
FIG. 2 is an enlarged fragmentary sectional view of the valve seat and valve element of the invention.

Referring to FIG. 2, the retainer 40 is in the form of an open cylinder having an internal shoulder 48 engageable with the shoulder 42 on the stem member 36. At the end opposite the shoulder 48 there is an inwardly turned lip 50 which is engageable with the valve disc 46 when the valve moves to its open position. When the poppet is assembled, the disc 46 and ball 44 are inserted into the top of the retainer, and the poppet is positioned over the ball, after which a lip 52 formed on the upper end of the retainer 40 is crimped over the shoulder 42 to retain the valve assembly in position on the stem 36.

The poppet assembly is normally biased in the closed position shown in FIG. 1, by the spring 18. In the position shown, the spring 18 acts on the stem member 36 to apply a downward force on the valve disc through the ball 44, maintaining the disc in engagement with the valve seat 34. The ball serves a self-centering function to insure that the closing force is applied to the center of the disc, even if there is some misalignment of the stem.

When the pressure beneath the valve disc is great enough to overcome the force of spring 18, the disc 46 will lift off the seat 34 to open a flow path from the inlet bore 26 to the exhaust ports 28. When the valve is in its open position, the ball 44 and disc 46 are retained in position relative to the stem 36 by the retainer 40. For manual operation of the valve, a bail 54 is attached to the protruding end of the stem 36.

FIG. 2 provides an enlarged view of the poppet assembly, shown in somewhat exaggerated form for purposes of illustration. As shown, the disc 46 has sufficient flexibility to deflect a distance "δ" when the closing force of the valve is applied at the center of the disc. The point application of the closing force is made possible by the free-floating relationship between the stem and the ball and between the ball and the disc within the retainer 40.

When the disc 46 deflects as shown, it can be seen that the disc contacts only the inner edge of the valve seat 34, thus achieving the desired knife edge configuration. While the present design essentially achieves all the advantages of an ideal knife edge seat, it also avoids some of the detrimental characteristics. Since the seat has more edge mass than the idealized knife edge, there is relatively little erosion and destortion due to high-velocity particles. The self-aligning aspects of the ball poppet structure eliminates the need for extremely tight tolerance and complicated machining of the seat, thereby making the valve relatively inexpensive to produce.

The specific metal used for the disc 46, and the actual dimensions of the disc are not considered to be critical to the present invention. It has been found, however, that a disc made from free-machining grade 303 stainless steel, soft annealed with a yield strength around 40,000 psi, with a thickness to diameter ratio between 0.15 and 0.17 provides satisfactory results.

We claim:

1. In a relief valve comprising a body having an inlet port formed therein; a chamber intersecting said inlet port, an annular valve seat formed on said body adjacent the intersection of said chamber and said inlet port; at least one exhaust port formed through said body leading outwardly of said chamber; a poppet assembly disposed within said chamber and movable between a first position in engagement with said valve seat and a second position out of engagement with said valve seat, said poppet assembly comprising an elongated stem member, a seal element engageable with said valve seat, and self-centering means acting between said stem member and said seal element; and a spring biasing said poppet assembly into engagement with said valve seat; the improvement wherein said seal element comprises a metallic disc of unitary composition sealingly engageable with said valve seat, and said valve seat is defined by a annular projection upstanding from said body and having a substantially flat upper surface engageable by said disc, said disc being capable of deflecting under the influence of said biasing force to cause said disc to contact only the inner edge of said annular valve seat.

2. Apparatus as claimed in claim 1 in which said poppet assembly comprises an elongated stem member having a recess formed in the end thereof, a ball received within said recess in engagement with said disc, and a cylindrical retainer surrounding a portion of said stem member and engageable therewith and with said disc to retain said stem member, ball and disc in mutual engagement.

3. Apparatus as claimed in claim 2, in which said ball and said disc are received within said retainer in a manner which permits at least limited movement of said disc axially and transversely relative to said stem member.

4. Apparatus as claimed in claim 1, in which said disc is formed of stainless steel.

5. Apparatus as claimed in claim 1 in which said disc has a uniform cross section and has a thickenss-to-diameter ratio in the range between 0.15 and 0.17.

* * * * *